J. R. HOPPER.
POTATO DIGGER.
No. 88,295. Patented Mar. 30, 1869.
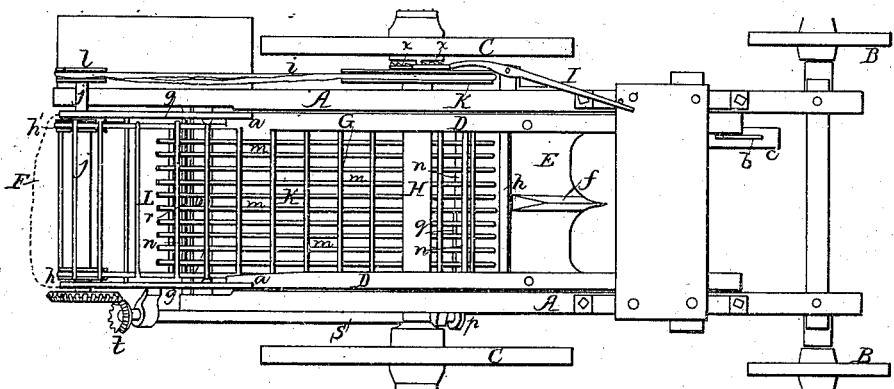
Fig. 2.
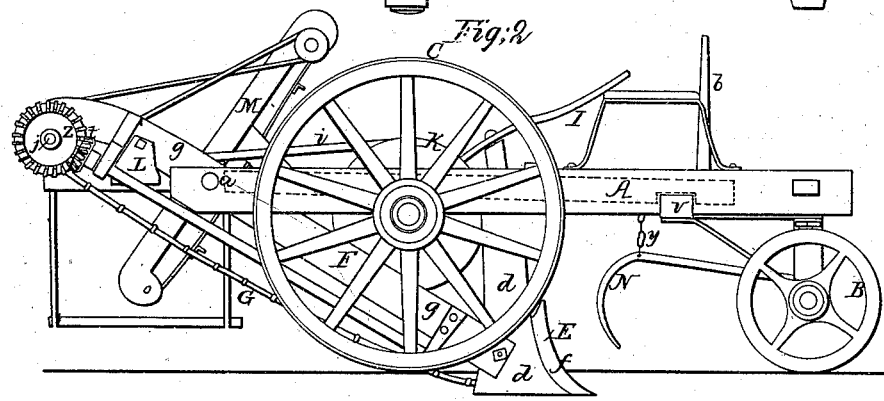
Fig. 3.
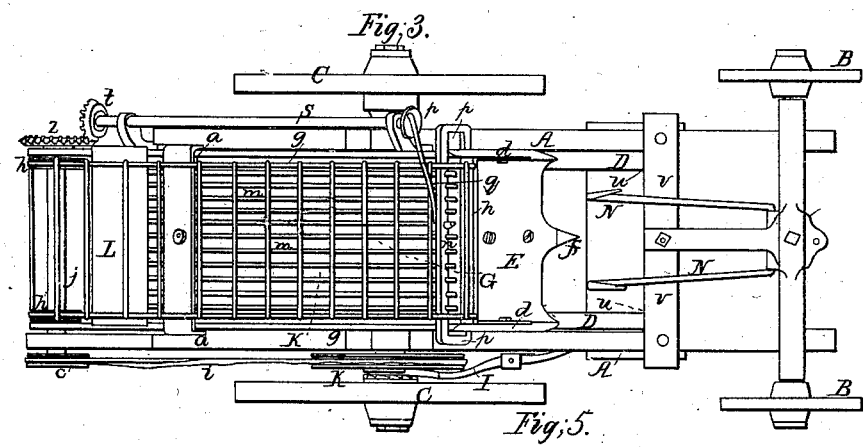
Fig. 4. Fig. 5.
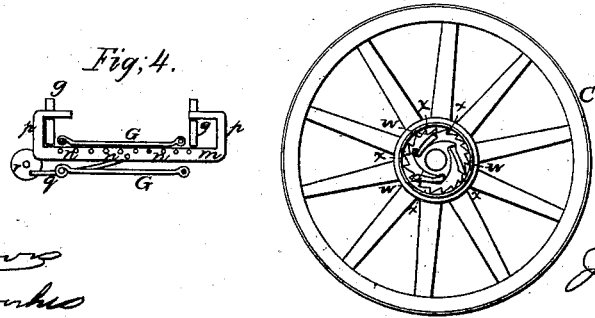
Witnesses. Inventor.
John R. Hopper

JOHN R. HOPPER, OF ROCHESTER, NEW YORK.

Letters Patent No. 88,295, dated March 30, 1869.

IMPROVEMENT IN POTATO-DIGGERS

The Schedule referred to in these Letters Patent and making part of the same.

*To all whom it may concern:*

Be it known that I, JOHN R. HOPPER, of Rochester, in the county of Monroe, and State of New York, have invented a certain new and useful Improvement in Potato-Diggers; and I do hereby declare that the following is a full and exact description thereof, reference being had to the accompanying drawings, making part of this specification.

Figure 1 is a plan of my improved machine.
Figure 2, a side elevation.
Figure 3, a bottom view.
Figures 4 and 5, detail views.

Like letters of reference indicate corresponding parts in all the figures.

My invention consists in an improved mode of suspending the endless apron, scoop, and connecting parts, and an improved construction of the same.

In the drawings—

A indicates a main frame mounted upon truck-wheels B B, in front, and driving-wheels C C in the rear.

Inside the main frame is an auxiliary frame, consisting of bars D D, pivoted at *a a*, and carrying the scoop E and endless-apron frame F, these bars being elevated or depressed at their front ends, to throw the scoop out of the ground, by means of a cam-lever, *b*, or equivalent, striking upon floor *c*, as shown.

The scoop is connected with bars D D by vertical side standards *d d*, which cut each side of the row, while the scoop itself raises the earth and slides it back up the inclined plane.

The scoop is provided with a central cutter, *f*, which serves to cut or divide the hills.

The endless-apron frame consists of two bars, *g g*, extending from the bottom of the standards *d d* upward and backward a suitable extent, having bearings *h h' h'* at bottom and top, which carry the endless apron G, made up of the ordinary cross-bars, or slats, and side chains or cords.

This apron is driven by a band, *i*, extending from large pulley *k*, on driving-shaft H, to small pulley *l* on shaft *j*.

Pulley *k* has a ratchet-coupling on its hub, and slides freely on the axle, and is thrown in and out of gear with the hub of the driving-wheel by a lever, I.

Directly beneath the upper half or length of the endless apron, is situated a riddle, K, made up of longitudinal rods *m m*, at suitable distances apart, resting in cleats, or cross-bars *n n*.

The upper part of this riddle turns upon a pivot, *o*, but the lower end, which is suspended on hangers *p p*, so as to shake freely, receives a cross reciprocating, or shaking action by means of pitman *q*, operated by crank *r*.

This crank, in turn, receives motion through shaft *s*, having a pinion, *t*, which gears with bevel-wheel *z* on shaft *j*.

The riddle thus shakes in close proximity to the under side of the upper half, or length of the endless apron, and produces a counter, or cross-action to it, the advantage of which is that while the slats of the apron raise the mass of earth with the potatoes adhering, the riddle, by its rapid cross-action, effectually stirs it around, thereby giving a double agitation which is most effective in producing the desired separation.

This counter-agitation, it will be noticed, extends all the way up from the bottom to near the top, so that in their long-continued passage, the potatoes receive a most thorough screening.

In addition to the above, the counter-action of the riddle spreads the mass thoroughly over the whole surface of the apron, so as to sift to the best advantage, and the potatoes lying between the riddle-rods will be carried up readily in a straight line and discharged.

In other machines, where endless aprons have been used, the mass elevated has rested entirely upon the cross-slats of the apron itself, and received no shaking. In some cases, however, I am aware that riddles have been employed, but alone, and not in combination with the apron, by which, I claim, the most beneficial effect is produced.

Besides the above, I claim a special advantage in combining the apron, the riddle, and their connecting and operating-parts in one body in the auxiliary frame D D, pivoted at *a a*, and extending forward to the driver's seat, so as to be under his control.

By this means, the driver can elevate the scoop sufficiently in advance of an obstruction to get it out of danger. He also has the long end of the lever to act upon in raising; also, by disconnecting the pivots *a a*, the whole attachment comes from place.

The front ends of the bars D have notches, *u u*, which, shutting down over the timber. *v*, transfer a part of the strain from pivots *a* to said timber *v*.

At the top of the riddle, the cleared potatoes are severed from the vines by a cutter at that point, and fall into an inclined spout, or trough, L, which conducts them off sidewise, either on to the ground or into the buckets of an elevator, M, attached to the side of the frame, from whence they may be conducted into a box, or receptacle on the top of the machine.

A vine-clearer, N, is used in front, simply for the purpose of dividing the vines between the rows, to allow them to pass up freely over the inclined apron without tangling or clogging.

This vine-clearer is attached, by connections *y y*, to the ends of bars D D, so as to be raised by the same movement of lever *b*.

In order turn the axle with the driving-wheels, and yet allow it to free in backing up, I employ an improved ratchet-arrangement, shown in fig. 5, in which no springs are employed, to press the pawls *w w* to engagement with the teeth *x x*, but they fall into engagement by their own gravity, while the parts slide out free in back action.

A combined digger and planter may be readily made from this machine by unshipping and removing from place the apron, riddle, and scoop, with their connecting-parts, and applying a hopper, or receptacle over the main frame, with a seed-roller passing through, which takes up the seed successively and drops it down into an opening-drill tooth.

In this case, in place of the scoop, plow-wings are applied on the standards, with a bar connecting across to keep the standards in place; and these wings simply turn the earth in over the drill after the seed is dropped.

What I claim as my invention, and desire to secure by Letters Patent, is—

The arrangement, in the auxiliary frame D D, of the endless apron G and shaking-riddle K, combined together as described, and operated in the manner and for the purpose herein set forth.

In witness whereof, I have hereunto signed my name, in the presence of two subscribing witnesses.

JOHN R. HOPPER.

Witnesses:
R. F. OSGOOD,
J. A. DAVIS.